April 26, 1932.  J H. HUNT  1,855,451
WHEEL STRUCTURE ADAPTED FOR DEMOUNTABLE RIMS
Filed April 7, 1928
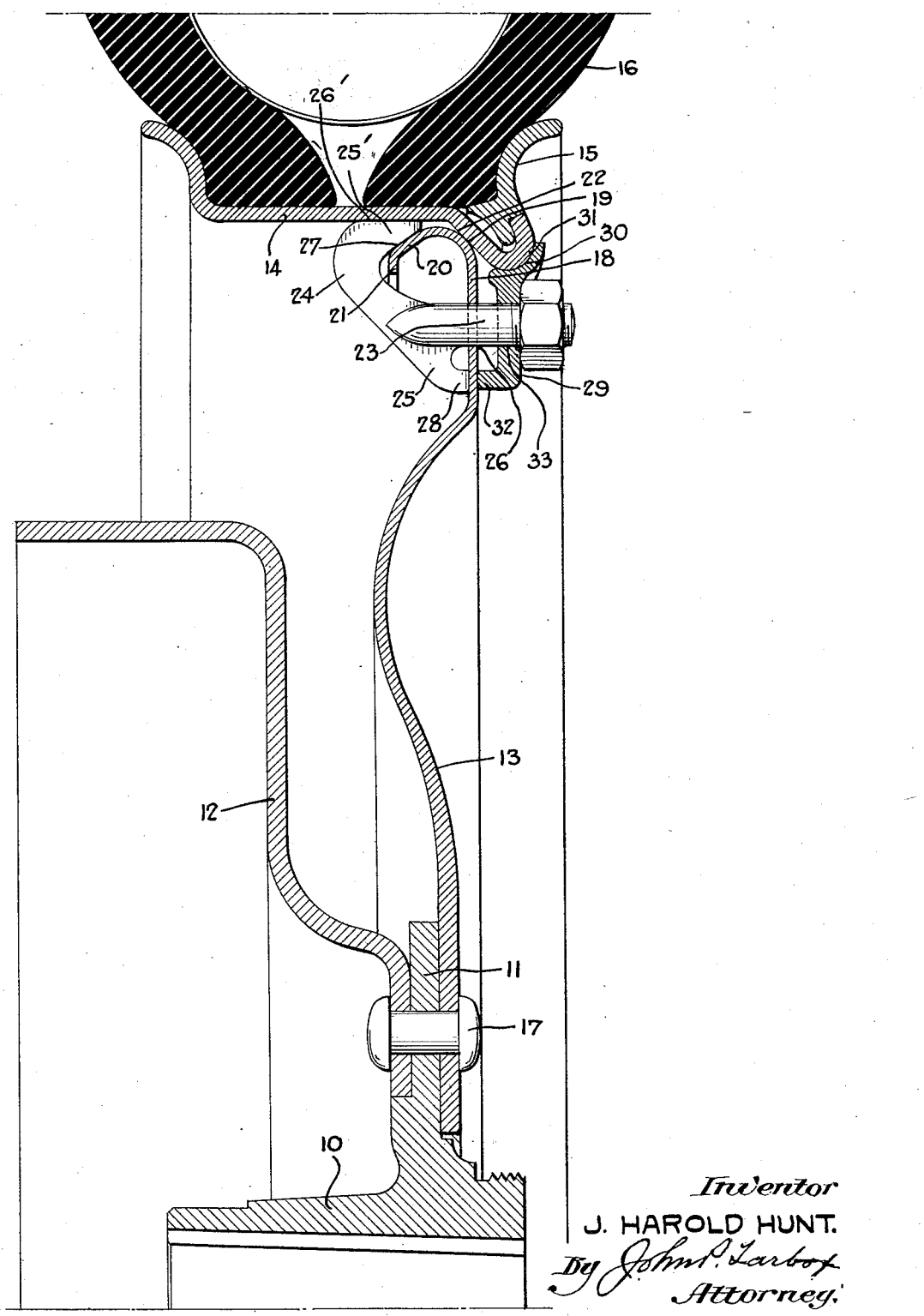
Inventor
J. HAROLD HUNT.
By John P. Larbox
Attorney.

Patented Apr. 26, 1932

1,855,451

UNITED STATES PATENT OFFICE

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA

WHEEL STRUCTURE ADAPTED FOR DEMOUNTABLE RIMS

Application filed April 7, 1928. Serial No. 268,343.

My invention relates to wheels and particularly to the type of wheels having a demountable rim.

It is an object of my invention to provide a wheel of this type in which the peripheral edge of the disc wheel body seating the demountable rim is strengthened and provided with securing means for the rim which coact therewith and with the disc to effect a very firm and effective clamping and centering and supporting action between the rim and the disc.

My invention is particularly applicable to the mounting of rims having one edge thereof depressed to form the gutter for the removable tire-retaining flange, and I attain the objects thereof in part by reversely bending the outer periphery of the disc to form a seating surface having oppositely-inclined seats, upon which the rim is adapted to be effectively clamped, centered and supported by the action of the peripherally-spaced clamping means having outer and inner members adapted to be drawn together, the inner one of said members having a wedge portion engaging between the rim and one of said inclined seats on the disc, while the outer clamp engages the outer face of the rim and forces the inclined face of the gutter depression firmly in contact with the other of said inclined seats on the reversely-bent periphery of the disc. I wish it to be understood that certain features of the invention are equally applicable to other than disc wheels.

Other objects and advantages and the manner in which they are attained will become apparent from the following detailed description taken in connection with the drawing, in which I have illustrated one embodiment of my invention and in which—

The figure represents, in axial section, a disc wheel embodying my invention.

In the drawing, numeral 10 represents the hub body of a wheel, numeral 11 a radial hub flange, numeral 12 a brake drum, numeral 13, the disc wheel body, numeral 14 the rim, numeral 15 the detachable tire-retaining flange, and numeral 16 the tire seated on the rim. The disc wheel body and brake drum are herein shown as secured to the hub flange by rivets 17, but any suitable securing device could obviously be employed, the hub construction forming no part of the present invention.

At its outer periphery, the disc body of the wheel is specially formed with a view to strengthening it and provide effective seating means for the demountable rim and its securing means. Adjacent its outer periphery, the disc body is provided, to this end, with a radially-extending portion 18 which is curved inwardly at its outer edge to form an arcuate portion 19, forming an outwardly-inclined seat for the rim and the arcuate portion 19 is extended by an inwardly and axially-inclined portion 20 which terminates in a short radial flange 21.

This construction provides an exceedingly strong and rigid peripheral margin of the disc body, and substantially eliminates distortion strains due to violent side thrusts on the rim and to the clamping action of the securing means, besides providing, with these means, a symmetrical and balanced support for the rim and thus supports the rim also against distortion strains due to unequal load on opposite sides thereof.

The manner in which the clamping means cooperate with the return-bent peripheral portion of the wheel body and the rim to so securely mount the rim thereon will now be described:

As already intimated, the rim seats, through its axially and outwardly-inclined surface 22, upon the correspondingly inclined arcuate portion 19 of the disc wheel body and it is drawn tightly up against this seat by a plurality of spaced clamping means each of which comprises an inner generally T-shaped member and an outer generally L-shaped member, as shown in the figure. The former comprises a shank 23, and outer and inner arms 24 and 25 inclined to the axis of the shank, the shank extending through a hole 26 arranged centrally of the radial portion 18 of the disc body and being threaded at its outer end. The long arm 24 is reversely bent to form a wedge-shaped end portion or nib 25', the outer side wall 26' of which is flat and forms a wide seat for the bottom of the rim while the inner side wall 27 conforms to the axially and inwardly-inclined portion 20 of the reversely-bent portion of the disc body. The short arm 25 is bent to form a projection 28 abutting the inside surface of the radially-extending portion 18 of the disc adjacent the inner of said portion.

The outer L-shaped element has a main radially-extending body portion 29 having its upper end enlarged to form a concave seat 30 within which the arcuate bottom and outside faces 31 of the depression forming the gutter of the rim seats, and a transversely-extending arm 32 connected to the inner end of the body portion 29 and abutting the outside of the disc at a joint directly opposite the projection 28 on the inner clamping member.

The shank 23 of the inner clamping member has its screw-threaded end project through and beyond a hole 33 arranged centrally of the body portion 29 of the outer clamping member, and the parts are drawn together by a nut 34 threaded on said shank. When the clamping means are all tightened, they, together with the arcuate portion 19 of the disc, serve to form a wide transverse support for the rim, and torsional strains on the rim are substantially eliminated. Furthermore, the combined wedging and clamping action of the securing means serve to accurately center the rim on the discs and at the same time providing the wide support above referred to. The balanced arrangement of the clamping arms about the axis of the shank 23 eliminates bending strains on this shank and serves to, in a large measure, avoid localized bending stresses in the disc body.

My improved construction also eliminates distortion of the relatively thin margin of the disc, the reverse bend greatly stiffening this margin while the perfect symmetry and balance of the application of the clamping operations not only further stiffens but also avoids the application of distorting forces.

What I claim as new and useful is:

1. In a vehicle wheel, a wheel body having outer and inner seats formed at its periphery, said inner seat being inclined radially and inwardly, a rim having an inclined shoulder seated against said outer seat and means for clamping said rim to said wheel body comprising an inner member having a wedge portion entering between said inclined seat and the rim, and a bearing against said wheel body radially inward of said inclined seat, and an outer member having one end thereof bearing against the rim and its opposite end bearing against the outer side of the wheel body at a point substantially opposite said inward bearing of the inner member, and means for drawing said members together.

2. In a vehicle wheel, a wheel body having outer and inner oppositely inclined seats formed at its periphery, a rim having an inclined shoulder seated against said outer seat, and means for clamping said rim to said wheel body comprising an inner member having a wedge portion entering between said inner inclined seat and the rim and a portion bearing against said wheel body radially inward of said inclined seat, and an outer member having one end thereof bearing against the bottom and outside face of said rim and its other end bearing against the outer side of the wheel body at a point substantially opposite said inward bearing of the inner member, and means arranged substantially centrally of said members for drawing said members together.

3. In a vehicle wheel, a disc body having its outer edge reversely bent to form inner and outer oppositely inclined surfaces, a rim having an inclined surface seated against the outer of said inclined surfaces, clamping means engaging the inner of said inclined surfaces and a second clamping means engaging the outside face of the rim and co-acting with said first named clamping means to secure the rim to the disc body.

4. In a vehicle wheel, a wheel body having its outer edge reversely bent to form inner and outer oppositely inclined surfaces, a rim having an inclined surface seated against the outer of said inclined surfaces, clamping means engaging the inner of said inclined surfaces and a second clamping means engaging the outside face of the rim and co-acting with said first named clamping means to secure the rim to the wheel body.

5. In a vehicle wheel, a disc body having its outer edge reversely bent to form inner and outer oppositely inclined seats, said inner seat being inclined radially and inwardly, a rim having a shoulder seated against said outer seat, clamping means having a wedge portion entering between the inclined inner seat and the rim, a second clamping means coacting with said first clamping means and engaging the outside face of the rim.

In testimony whereof he hereunto affixes his signature.

J. HAROLD HUNT.